US012230872B2

(12) United States Patent
Park et al.

(10) Patent No.: US 12,230,872 B2
(45) Date of Patent: Feb. 18, 2025

(54) ANTENNA DEVICE AND DISPLAY DEVICE INCLUDING THE SAME

(71) Applicant: DONGWOO FINE-CHEM CO., LTD., Jeollabuk-do (KR)

(72) Inventors: Hee Jun Park, Gyeonggi-do (KR); Dong Pil Park, Incheon (KR); Jae Hyun Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 158 days.

(21) Appl. No.: 18/078,369

(22) Filed: Dec. 9, 2022

(65) Prior Publication Data

US 2023/0108271 A1 Apr. 6, 2023

Related U.S. Application Data

(63) Continuation of application No. PCT/KR2021/007070, filed on Jun. 7, 2021.

(30) Foreign Application Priority Data

Jun. 11, 2020 (KR) ........................ 10-2020-0070988

(51) Int. Cl.

*H01Q 1/38* (2006.01)
*H01Q 1/24* (2006.01)

(Continued)

(52) U.S. Cl.

CPC ............... *H01Q 1/38* (2013.01); *H01Q 1/243* (2013.01); *H01Q 1/48* (2013.01); *H01Q 5/10* (2015.01); *H01Q 5/307* (2015.01); *H01Q 21/00* (2013.01)

(58) Field of Classification Search

None

See application file for complete search history.

(56) References Cited

U.S. PATENT DOCUMENTS

2005/0030232 A1* 2/2005 Monebhurrun .......... H01Q 9/16 343/702
2011/0273360 A1* 11/2011 Campero ............... H01Q 5/307 343/893

(Continued)

FOREIGN PATENT DOCUMENTS

CN 205335427 U * 6/2016
CN 106025531 A 10/2016

(Continued)

OTHER PUBLICATIONS

Office action issued on Jun. 26, 2024 from Korean Patent Office in a counterpart Korean Patent Application No. 10-2020-0070988 (all the cited references are listed in this IDS.) (English translation is also submitted herewith.).

(Continued)

*Primary Examiner* — Dameon E Levi
*Assistant Examiner* — Anh N Ho
(74) *Attorney, Agent, or Firm* — The PL Law Group, PLLC

(57) ABSTRACT

An antenna device according to an embodiment includes a dielectric layer, a rhombus-shaped first radiator disposed on an upper surface of the dielectric layer, a transmission line connected to the first radiator, a signal pad connected to one end of the transmission line, ground pads disposed around the signal pad, and second radiators extending from the ground pad along lower sides of the first radiator.

10 Claims, 6 Drawing Sheets

(51) Int. Cl.

| | |
|---|---|
| ***H01Q 1/48*** | (2006.01) |
| ***H01Q 5/10*** | (2015.01) |
| ***H01Q 5/307*** | (2015.01) |
| ***H01Q 21/00*** | (2006.01) |

(56) References Cited

U.S. PATENT DOCUMENTS

| | | | | |
|---|---|---|---|---|
| 2018/0269566 | A1* | 9/2018 | Kerselaers | H01Q 1/38 |
| 2019/0067834 | A1* | 2/2019 | Park | H01Q 5/385 |
| 2021/0313691 | A1* | 10/2021 | Byun | G06F 3/0443 |
| 2022/0276682 | A1* | 9/2022 | Yu | H01Q 25/001 |

FOREIGN PATENT DOCUMENTS

| | | | | | |
|---|---|---|---|---|---|
| CN | 111063992 | A | | 4/2020 | |
| CN | 215119232 | U | | 12/2021 | |
| EP | 2 093 890 | A1 | | 8/2009 | |
| EP | 2369674 | A2 | * | 9/2011 | H01Q 1/243 |
| JP | 2005-286854 | A | | 10/2005 | |
| KR | 10-2004-0052561 | A | | 6/2004 | |
| KR | 10-2005-0055551 | A | | 6/2005 | |
| KR | 10-2009-0065649 | A | | 6/2009 | |
| KR | 10-2012-0129295 | A | | 11/2012 | |
| KR | 101263416 | B | * | 5/2013 | |
| KR | 10-2013-0137529 | A | | 12/2013 | |
| KR | 10-2020-0010906 | A | | 1/2020 | |

OTHER PUBLICATIONS

International Search Report for PCT/KR2021/007070 mailed on Oct. 5, 2021.

* cited by examiner

ANTENNA DEVICE AND DISPLAY DEVICE INCLUDING THE SAME

PRIORITY

The present application is a continuation application to International Application No. PCT/KR2021/007070 with an International Filing Date of Jun. 7, 2021, which claims the benefit of Korean Patent Applications No. 10-2020-0070988 filed on Jun. 11, 2020 at the Korean Intellectual Property Office, the disclosures of which are incorporated by reference herein in their entirety.

BACKGROUND

1. Field

The present invention relates to an antenna device and a display device including the same.

2. Background of the Related Art

Recently, according to development of the information-oriented society, wireless communication techniques such as Wi-Fi, Bluetooth, and the like are implemented, for example, in a form of smartphones by combining with display devices. In this case, an antenna may be coupled to the display device to perform a communication function.

Recently, with mobile communication techniques becoming more advanced, it is necessary for an antenna for performing communication in ultra-high frequency bands to be coupled to the display device.

In addition, as the display device on which the antenna is mounted becomes thinner and lighter, a space occupied by the antenna may also be reduced. Accordingly, it is not easy to simultaneously implement the transmission and reception of high frequency and wideband signals within a limited space.

For example, in the case of recent 5G mobile communication in high frequency bands, as the wavelength is shorter, a case in which signal transmission and reception may be blocked occurs, and it may be necessary to implement the transmission and reception of multi-band signals.

Therefore, it is necessary to apply an antenna to a display device in a form of a film or a patch, and in order to implement the above-described high frequency communication, a structural design of the antenna to secure the reliability of radiation characteristics is required despite a thin structure.

For example, Korean Patent Laid-Open Publication No. 2010-0114091 discloses a dual patch antenna module, but it may not be sufficient to be applied to a small device because the antenna module is manufactured in a thin shape within a limited space.

SUMMARY

According to an aspect of the present invention, there is provided an antenna device and a display device including the same.

The above aspects of the present invention will be achieved by one or more of the following features or constructions:

1. An antenna device including: a dielectric layer; a rhombus-shaped first radiator disposed on an upper surface of the dielectric layer; a transmission line connected to the first radiator; a signal pad connected to one end of the transmission line; ground pads disposed around the signal pad; and a second radiator extending from the ground pad along a lower side of the first radiator.
2. The antenna device according to the above 1, wherein the second radiator extends in parallel to the lower side of the first radiator at a regular interval.
3. The antenna device according to the above 1, wherein the first radiator has a shape in which one or more corners are cut.
4. The antenna device according to the above 1, wherein the second radiator has a shape in which one or more corners are cut.
5. The antenna device according to the above 1, wherein a resonance frequency of the first radiator and a resonance frequency of the second radiator are different from each other.
6. The antenna device according to the above 1, wherein the second radiator is electrically and physically separated from the first radiator and the transmission line.
7. The antenna device according to the above 1, wherein the second radiator and the ground pad are formed as a single member.
8. The antenna device according to the above 1, wherein at least one of the first radiator, the second radiator and the transmission line is formed in a mesh structure, and at least one of the signal pad and the ground pad is formed in a solid structure.
9. The antenna device according to the above 1, wherein the second radiator includes a pair of second radiators disposed to face each other with the transmission line interposed therebetween on the upper surface of the dielectric layer.
10. The antenna device according to the above 1, further comprising a dummy pattern disposed around the first radiator and the second radiator on the upper surface of the dielectric layer.
11. The antenna device according to the above 10, wherein the dummy pattern is formed in a mesh structure.
12. A display device including the antenna device according to the above-described embodiments.

By disposing the first radiator and the second radiators adjacent to each other on the upper surface of the dielectric layer, it is possible to implement a dual band antenna in which the first radiator and the second radiators are coupled with each other.

In addition, by implementing the second radiators along the lower sides of the rhombus-shaped first radiator, antenna gain may be improved.

In addition, by forming the antenna conductive layer of the antenna device positioned on the display unit of the display device in a mesh structure, transmittance of the antenna device may be improved, and it is possible to suppress the antenna device from being viewed by a user when it is mounted on the display device.

DETAILED DESCRIPTION OF THE EMBODIMENTS

Figure 1:
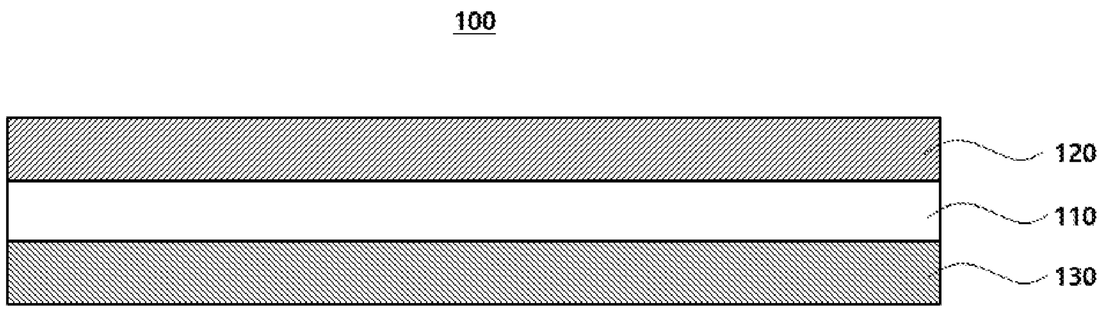
FIG. 1 is a schematic cross-sectional view illustrating an antenna device according to an embodiment.

Hereinafter, embodiments will be described in detail with reference to the accompanying drawings. In denoting reference numerals to components of respective drawings, it should be noted that the same components will be denoted by the same reference numerals although they are illustrated in different drawings.

In the description of preferred embodiments of the present invention, the publicly known functions and configurations that are judged to be able to make the purport of the present invention unnecessarily obscure will not be described in detail. Further, wordings to be described below are defined in consideration of the functions of the embodiments, and may differ depending on the intentions of a user or an operator or custom. Accordingly, such wordings should be defined on the basis of the contents of the overall specification.

It will be understood that, although the terms first, second, etc. may be used herein to describe various elements or components, these elements or components should not be limited by these terms. As used herein, the singular forms “a,” “an” and “the” are intended to include the plural forms as well, unless the context clearly indicates otherwise. It will be further understood that the terms “comprises,” “comprising,” “includes” and/or “including,” when used herein, specify the presence of stated features, integers, steps, operations, elements, components and/or a combination thereof, but do not preclude the presence or addition of one or more other features, integers, steps, operations, elements, components, and/or a combination thereof.

Further, directional terms such as “one side,” “the other side,” “upper,” “lower,” and the like are used in connection with the orientation of the disclosed drawings. Since the elements or components of the embodiments of the present invention may be located in various orientations, the directional terms are used for illustrative purposes, and are not intended to limit the present invention thereto.

In addition, a division of the configuration units in the present disclosure is intended for ease of description and divided only by the main function set for each configuration unit. That is, two or more of the configuration units to be described hereinafter may be combined into a single configuration unit or formed by two or more of divisions by function into more than a single configuration unit. Further, each of the configuration units to be described hereinafter may additionally perform a part or all the functions among functions set for other configuration units other than being responsible for the main function, and a part of the functions among the main functions set for each of the configuration units may be exclusively taken and certainly performed by other configuration units An antenna device described in the present disclosure may be a patch antenna or a microstrip antenna manufactured in a form of a transparent film. For example, the antenna device may be applied to electronic devices for high frequency or ultra-high frequency (e.g., 3G, 4G, 5G or more) mobile communication, Wi-Fi, Bluetooth, near field communication (NFC), global positioning system (GPS), and the like, but it is not limited thereto. In addition, the antenna device may be applied to various target structures such as an automobile, a building and the like.

In the following drawings, two directions which are parallel to an upper surface of a dielectric layer and cross each other are defined as a first direction and a second direction. In this case, the first direction and the second direction may cross each other perpendicularly. In addition, a direction perpendicular to the upper surface of the dielectric layer is defined as a third direction. For example, the first direction may correspond to a length direction of the antenna device, the second direction may correspond to a width direction of the antenna device, and the third direction may correspond to a thickness direction of the antenna device.

FIG. 1 is a schematic cross-sectional view illustrating an antenna device according to an embodiment.

Referring to FIG. 1, an antenna device 100 may include a dielectric layer 110 and an antenna conductive layer 120.

The dielectric layer 110 may include an insulation material having a predetermined dielectric constant. According to an embodiment, the dielectric layer 110 may include an inorganic insulation material such as glass, silicon oxide, silicon nitride, or metal oxide, or an organic insulation material such as an epoxy resin, an acrylic resin, or an imide resin. The dielectric layer 110 may function as a film substrate of the antenna device on which the antenna conductive layer 120 is formed.

According to an embodiment, a transparent film may be provided as the dielectric layer 110. In this case, the transparent film may include a polyester resin such as polyethylene terephthalate, polyethylene isophthalate, polyethylene naphthalate, polybutylene terephthalate, etc.; a cellulose resin such as diacetyl cellulose, triacetyl cellulose, etc.; a polycarbonate resin; an acrylic resin such as polymethyl (meth)acrylate, polyethyl (meth)acrylate, etc.; a styrene resin such as polystyrene, acrylonitrile-styrene copolymer, etc.; a polyolefin resin such as polyethylene, polypropylene, cyclic polyolefin or polyolefin having a norbomene structure, ethylene-propylene copolymer, etc.; a vinyl chloride resin; an amide resin such as nylon, aromatic polyamide; an imide resin; a polyether sulfonic resin; a sulfonic resin; a polyether ether ketone resin; a polyphenylene sulfide resin; a vinylalcohol resin; a vinylidene chloride resin; a vinylbutyral resin; an allylate resin; a polyoxymethylene resin; an epoxy resin; a urethane or acrylic urethane resin; a silicone resin and the like. These transparent films may be used alone or in combination of two or more thereof.

According to an embodiment, an adhesive film such as an optically clear adhesive (OCA), an optically clear resin (OCR), and the like may also be included in the dielectric layer 110.

In some embodiments, the dielectric layer 110 may include an inorganic insulation material such as silicon oxide, silicon nitride, silicon oxynitride, glass and the like.

According to an embodiment, the dielectric layer 110 may be formed in a substantial single layer, or may be formed in a multilayer structure of two or more layers.

Capacitance or inductance may be generated by the dielectric layer 110, thus to adjust a frequency band which can be driven or sensed by the antenna device 100. When the dielectric constant of the dielectric layer 110 exceeds about 12, a driving frequency is excessively reduced, such that driving of the antenna in a desired high frequency band may not be implemented. Therefore, according to an embodiment, the dielectric constant of the dielectric layer 110 may be adjusted in a range of about 1.5 to 12, and preferably about 2 to 12.

According to an embodiment, an insulation layer (e.g., an encapsulation layer, a passivation layer, etc. of a display panel) inside the display device on which the antenna device 100 is mounted may be provided as the dielectric layer 110.

The antenna conductive layer 120 may be disposed on an upper surface of the dielectric layer 110. The antenna conductive layer 120 may include one or more antenna units including a first radiator and a second radiator.

The antenna conductive layer 120 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), or an alloy containing at least one thereof. These may be used alone or in combination of two or more thereof.

For example, the antenna conductive layer 120 may include silver (Ag) or a silver alloy (e.g., a silver-palladium-copper (APC) alloy) to implement a low resistance. For another example, the antenna conductive layer 120 may include copper (Cu) or a copper alloy (e.g., a copper-calcium (CuCa) alloy) in consideration of low resistance and fine line width patterning.

According to an embodiment, the antenna conductive layer 120 may include a transparent conductive oxide such as indium tin oxide (ITO), indium zinc oxide (IZO), indium zinc tin oxide (IZTO), zinc oxide (ZnOx), or copper oxide (CuO).

According to an embodiment, the antenna conductive layer 120 may include a lamination structure of a transparent conductive oxide layer and metal layer, for example, and may have a two-layer structure of transparent conductive oxide layer-metal layer or a three-layer structure of transparent conductive oxide layer-metal layer-transparent conductive oxide layer. In this case, resistance may be reduced to improve signal transmission speed while improving flexible properties by the metal layer, and corrosion resistance and transparency may be improved by the transparent conductive oxide layer.

According to an exemplary embodiment, the antenna conductive layer 120 may include a blackening processing part. Accordingly, reflectance on the surface of the antenna conductive layer 120 may be reduced, thereby reducing the pattern from being viewed due to light reflection.

According to an embodiment, the surface of the metal layer included in the antenna conductive layer 120 is converted into metal oxide or metal sulfide to form a blackened layer. According to an embodiment, the blackened layer such as a black material coating layer or a plating layer may be formed on the antenna conductive layer 120 or the metal layer. Herein, the black material coating layer or plating layer may include silicon, carbon, copper, molybdenum, tin, chromium, nickel, cobalt, or oxide, sulfide, or an alloy containing at least one of them.

The composition and thickness of the blackened layer may be adjusted in consideration of an effect of reducing reflectance.

Specific details of the antenna conductive layer 120 will be described below with reference to FIGS. 2 and 7.

According to an embodiment, the antenna device 100 may further include a ground layer 130. Since the antenna device 100 includes the ground layer 130, vertical radiation characteristics may be implemented.

The ground layer 130 may be formed on a lower surface of the dielectric layer 110. The ground layer 130 may be disposed so as to be at least partially overlapped with the antenna conductive layer 120 with the dielectric layer 110 interposed therebetween. For example, the ground layer 130 may be overlapped with the radiator (see 210 and 230 in FIG. 2) of the antenna conductive layer 120.

According to an embodiment, a conductive member of the display device or display panel on which the antenna device 100 is mounted may be provided as the ground layer 130. For example, the conductive member may include electrodes or wirings such as a gate electrode, source/drain electrodes, pixel electrode, common electrode, data line, scan line, etc. of a thin film transistor (TFT) included in the display panel; and a stainless steel (SUS) plate, heat radiation sheet, digitizer, electromagnetic wave shielding layer, pressure sensor, fingerprint sensor, etc. of the display device.

Figure 2:
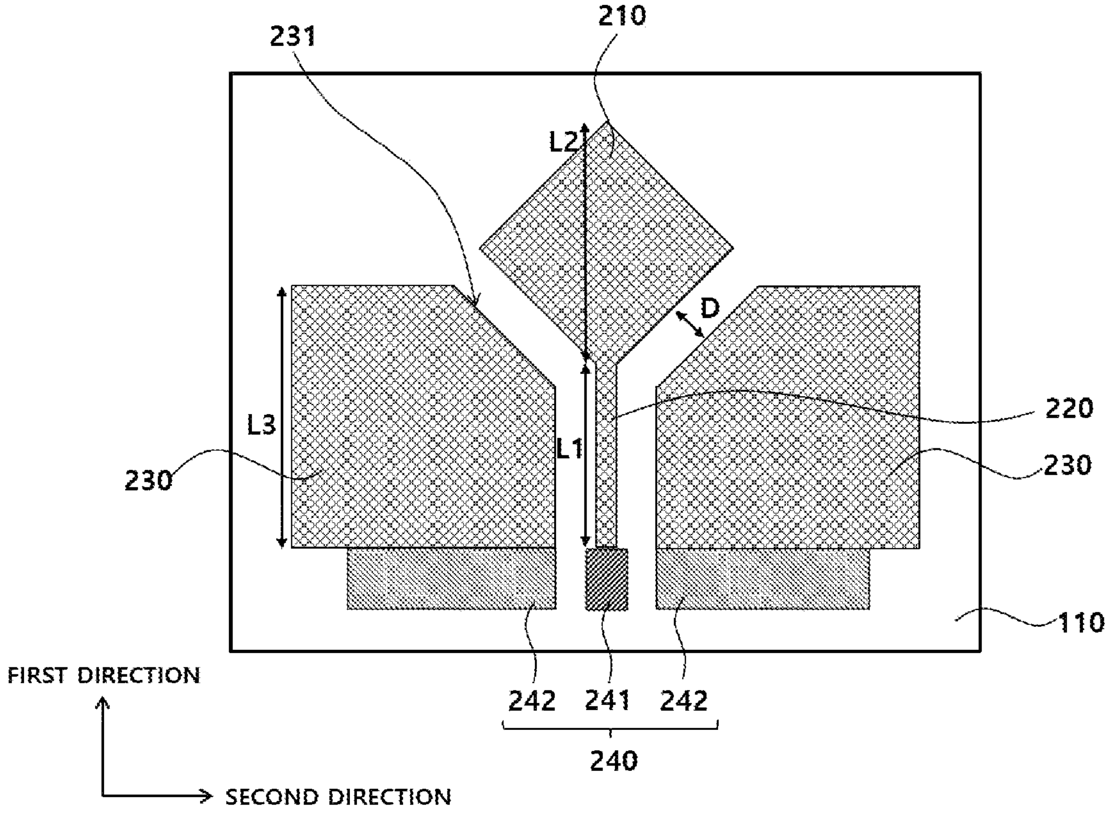
FIG. 2 is a schematic plan view illustrating the antenna device according to an exemplary embodiment.

FIG. 2 is a schematic plan view illustrating the antenna device according to an exemplary embodiment.

Referring to FIGS. 1 and 2, the antenna device 100 according to an embodiment may include the antenna conductive layer 120 formed on the upper surface of the dielectric layer 110. Herein, the antenna conductive layer 120 may include an antenna unit including a first radiator 210 and second radiators 230, a transmission line 220 and a pad electrode 240.

The first radiator 210 may radiate or receive a radio signal. The first radiator 210 may be formed in a mesh structure. Thereby, transmittance of the first radiator 210 may be increased, and flexibility of the antenna device 100 may be improved. Therefore, the antenna device 100 may be effectively applied to a flexible display device.

The first radiator 210 may be implemented so as to be driven or operated at a first resonance frequency. For example, lengths of the first radiator 210 in the first and second directions may be determined according to a desired first resonance frequency, radiation resistance, and gain of the first radiator 210, respectively. Herein, the first resonance frequency may be a band of 28 GHz, but it is not limited thereto.

According to an embodiment, the first radiator 210 may be implemented in a rhombus or diamond shape in which lower sides connected with the transmission line 220 have an inclination angle with respect to a straight line parallel to the second direction as shown in FIG. 2. However, this is only an example and the shape of the first radiator 210 is not particularly limited. That is, the first radiator 210 may be implemented in various shapes such as a rectangle, a circle and the like.

The transmission line 220 may supply a signal to the first radiator 210. The transmission line 220 is disposed between the first radiator 210 and a signal pad 241 of the pad electrode 240, and may be branched from the first radiator 210 to electrically connect the first radiator 210 and the signal pad 241.

According to an embodiment, the transmission line 220 may include substantially the same conductive material as the first radiator 210. In addition, the transmission line 220 may be formed as a substantial single member by integrally connecting with the first radiator 210, or may be formed as a separate member from the first radiator 210.

According to an embodiment, the transmission line 220 may be formed in a mesh structure having substantially the same shape (e.g., the same line width, the same interval, etc.) as the first radiator 210.

The second radiator 230 may radiate or receive a radio signal, and may be electrically and physically spaced apart from the first radiator 210 and the transmission line 220, and may be coupled to the first radiator 210 and the transmission line 220 to be supplied with a power.

The second radiator 230 may extend from the ground pad 242 of the pad electrode 240 to the first radiator 210 in parallel to the transmission line 220. In addition, a corner of the second radiator 230 on the first radiator 210 side has a cut shape, and the cut portion extends along the lower side of the rhombus-shaped first radiator 210. Specifically, a portion 231 from which the corner is cut ('corner cut portion') of the second radiator 230 may be spaced from the first radiator 210 at a regular interval D, and may be parallel with an opposite side of the first radiator 210. Herein, the regular interval D may be determined within a range that does not substantially affect the first radiator 210 due to an electric field generated between the second radiator 230 and the first radiator 210. For example, the predetermined distance D is constant at all positions and may be 50 μm to 125 μm.

According to an embodiment, the second radiator 230 may be formed as a substantial single member by integrally connecting with the ground pad 242, or may be formed as a separate member from the ground pad 242. In addition, the second radiator 230 may have a width which is formed smaller than, equal to, or larger than the width of the ground pad 242.

According to an embodiment, a pair of second radiators 230 may be formed in a coplanar waveguide with ground (CPW ground) structure disposed to face each other with the transmission line 220 interposed therebetween on the upper surface of the dielectric layer 110 having the ground layer 130 disposed on a lower surface thereof.

The length of the second radiator 230 in the first direction may be determined within a range satisfying Equation 1 below in consideration of a desired second resonance frequency. Herein, the second resonance frequency may be higher than the first resonance frequency. For example, the second resonance frequency may be a band of 38 GHz, but it is not limited thereto.

$$L1<L3\leq L1+L2 \qquad \text{[Equation 1]}$$

Wherein, L1 may represent the length of the transmission line 220 in the first direction, L2 may represent the length of the first radiator 210 in the first direction, and L3 may represent the length of the second radiator 230 in the first direction.

According to an embodiment, the second radiator 230 may be formed in a mesh structure having substantially the same shape (e.g., the same line width, the same interval, etc.) as the first radiator 210. Thereby, it is possible to improve a transmittance of the antenna pattern, and prevent the antenna device 100 from being viewed by a user when it is mounted on the display device. The second radiator 230 may include substantially the same conductive material as the first radiator 210.

As shown in FIG. 2, the second radiator 230 may be formed in a coplanar waveguide with ground (CPW ground) structure, and the first radiator 210 and the second radiator 230 of the CPW ground structure divide a supply current of the transmission line 220 in two. When the supply current of one transmission line 220 is divided in two, gains of the first radiator 210 and the second radiator 230 may be decreased. According to an embodiment, by implementing is such a way that the length of the second radiator 230 in the first direction satisfies the above-described Equation 1, and the corner of the second radiator 230 on the first radiator 210 side is cut so that the corner cut portion 231 is spaced apart from the first radiator 210 at the regular interval D to be parallel with the opposite side of the first radiator 210, it is possible to reduce a coupling distance of the first radiator 210 with the second radiator 230. Thereby, gains of the first radiator 210 and the second radiator 230 may be improved.

The pad electrode 240 may include the signal pad 241 and the ground pads 242.

The signal pad 241 may be connected to a distal end of the transmission line 220, thus to be electrically connected with the first radiator 210 through the transmission line 220. Thereby, the signal pad 241 may electrically connect a driving circuit unit (e.g., an IC chip, etc.) and the first radiator 210. For example, a circuit board such as a flexible printed circuit board (FPCB) may be bonded to the signal pad 241, and a driving circuit unit may be mounted on the flexible printed circuit board. Accordingly, the first radiator 210 and the driving circuit unit may be electrically connected with each other.

The ground pad 242 may be disposed around the signal pad 241 so as to be electrically and physically separated from the signal pad 241. For example, a pair of ground pads 242 may be disposed to face each other with the signal pad 241 interposed therebetween.

According to an embodiment, the signal pad 241 and the ground pad 242 may be formed in a solid structure including the above-described metals or alloy to reduce signal resistance.

Meanwhile, for the convenience of description, FIG. 2 illustrates only one antenna pattern, but a plurality of antenna patterns may be arranged on the upper surface of the dielectric layer 110 in an array form. In this case, a separation distance between the antenna patterns may be greater than half of a wavelength corresponding to the resonance frequency (e.g., the first resonance frequency or the second resonance frequency) of the antenna pattern in order to minimize radiation interference from each antenna pattern.

Figure 3:
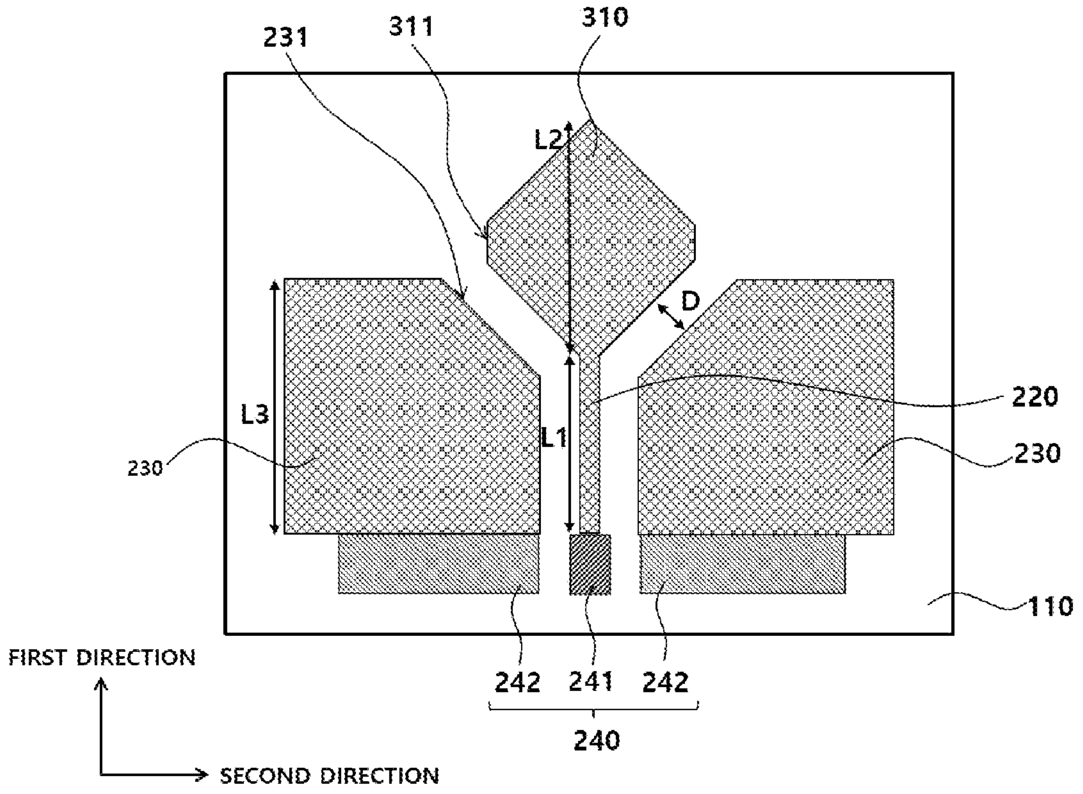
FIG. 3 is a schematic plan view illustrating an antenna device according to another embodiment.

FIG. 3 is a schematic plan view illustrating an antenna device according to another embodiment.

Referring to FIGS. 1 and 3, an antenna conductive layer 120 may include an antenna pattern including a first radiator 310 and second radiators 230, a transmission line 220, and a pad electrode 240. Herein, the transmission line 220, the second radiator 230 and the pad electrode 240 are the same as those described with reference to FIG. 2, and therefore will not be described in detail. In addition, the first radiator 310 is similar to the first radiator 210 shown in FIG. 2, and therefore will not be described in detail within the overlapping range.

As shown in FIG. 3, the first radiator 310 may include one or more corner cut portions 311. That is, one or more corners of the first radiator 310 may be cut, and in this case, the size or area to be cut may vary depending on specifications of the desired antenna device. Thereby, the first radiator 310 may generate circular polarization.

Figure 4:
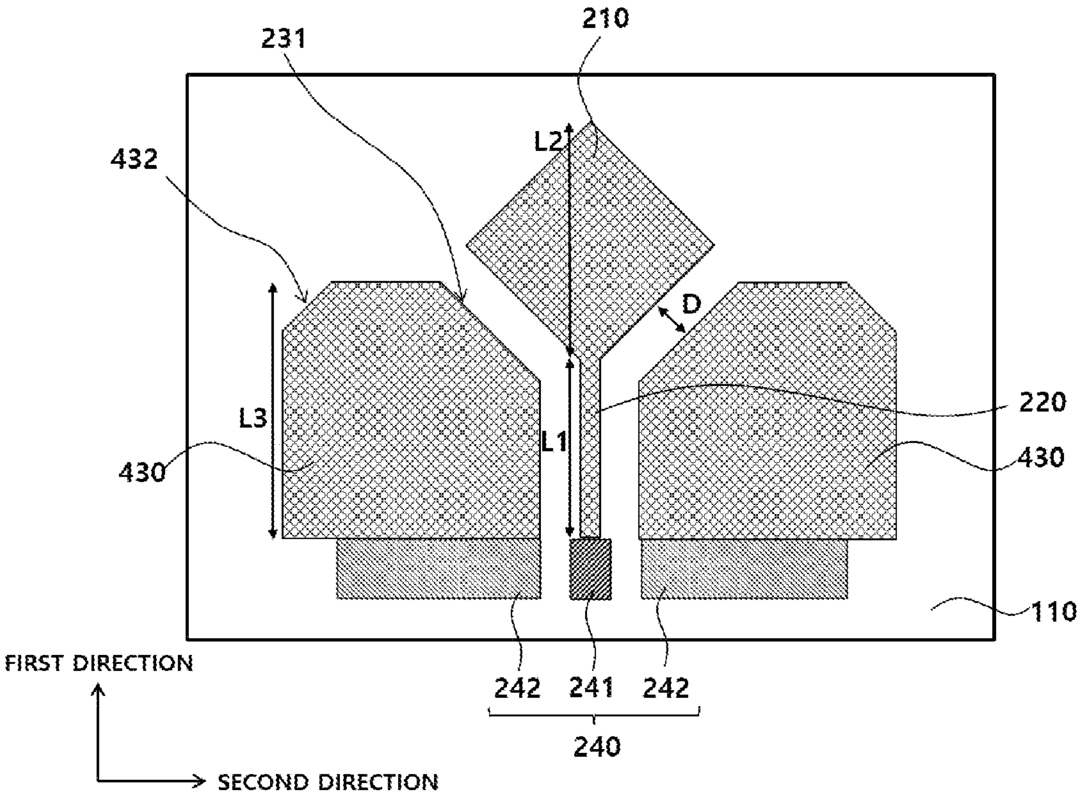
FIG. 4 is a schematic plan view illustrating the antenna device according to another embodiment.

FIG. 4 is a schematic plan view illustrating the antenna device according to another embodiment.

Referring to FIGS. 1 and 4, an antenna conductive layer 120 may include an antenna unit including a first radiator 210 and second radiators 430, a transmission line 220, and a pad electrode 240. Herein, the first radiator 210, the transmission line 220 and the pad electrode 240 are the same as those described with reference to FIG. 2, and therefore will not be described in detail. In addition, the second radiator 430 is similar to the second radiator 230 of FIG. 2, and therefore will not be described in detail within the overlapping range.

As shown in FIG. 4, the second radiator 430 may further include a corner cut portion 432 in addition to the corner cut portion 231. That is, in the second radiator 430, one or more corners may be additionally cut in addition to the corners on the first radiator 210 side, and in this case, the size or area thereof to be cut may be the same as the cut size and area of the corner cut portion 231. However, it is not limited thereto, and the cut size or area of the corner cut portion 432 may vary depending on the specifications of the desired antenna device.

Figure 5:
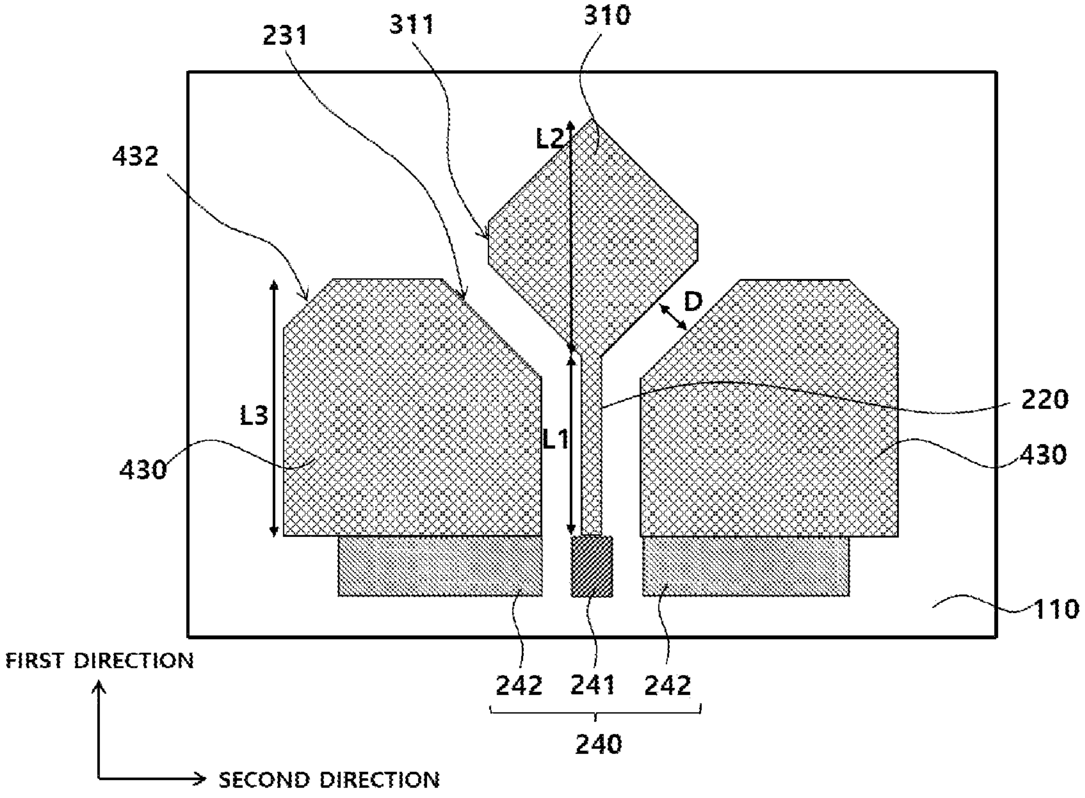
FIG. 5 is a schematic plan view illustrating an antenna device according to another embodiment.

FIG. 5 is a schematic plan view illustrating an antenna device according to another embodiment.

Referring to FIGS. 1 and 5, an antenna conductive layer 120 may include an antenna unit including a first radiator 310 and second radiators 430, a transmission line 220, and a pad electrode 240. Herein, the transmission line 220 and the pad electrode 240 are the same as those described with reference to FIG. 2, the first radiator 310 is the same as that described with reference to FIG. 3, and the second radiator 430 is the same as that described with reference to FIG. 4, and therefore will not be described in detail.

As shown in FIG. 5, one or more corners of the first radiator 310 may be cut, and one or more corners of the second radiator 430 may be additionally cut in addition to the corners on the first radiator 310 side.

Figure 6:
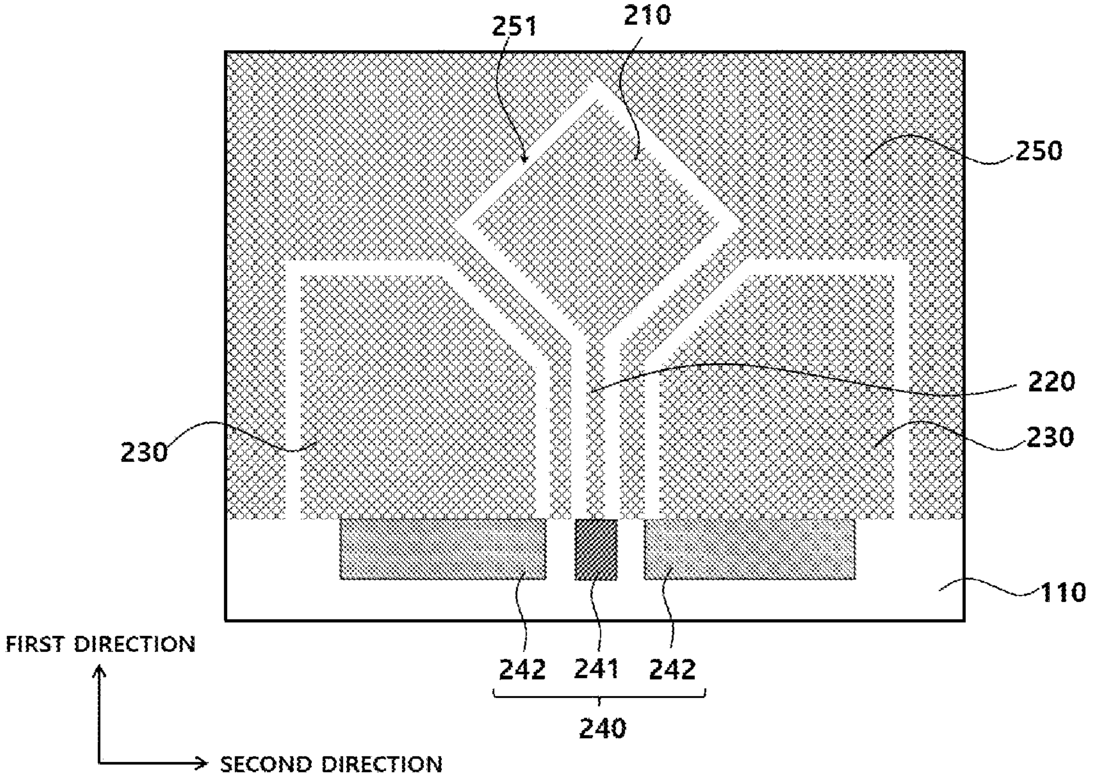
FIG. 6 is a schematic plan view illustrating an antenna device according to another embodiment.

FIG. 6 is a schematic plan view illustrating an antenna device according to another embodiment.

Referring to FIGS. 1 and 6, an antenna conductive layer 120 may include an antenna unit including a first radiator 210 and second radiators 230, a transmission line 220, a pad electrode 240 and a dummy pattern 250. Herein, the first radiator 210, the second radiator 230, the transmission line 220 and the pad electrode 240 are the same as those described with reference to FIG. 2, and therefore will not be described in detail.

The dummy pattern 250 may be arranged around the first radiator 210 and the second radiators 230, and may additionally be arranged between the first radiator 210 and the second radiators 230 and/or between the second radiators 230 and the transmission line 220.

The dummy pattern 250 may be formed in a mesh structure having substantially the same shape (e.g., the same line width, the same interval, etc.) as at least one of the first radiator 210, the second radiator 230 and the transmission line 220, and may include the same metal as at least one of the first radiator 210, the second radiator 230 and the transmission line 220. According to an embodiment, a portion of the mesh electrode forming the dummy pattern 250 may be segmented.

The dummy pattern 250 may be disposed so as to be electrically and physically separated from the first radiator 210, the second radiators 230, the transmission line 220 and the pad electrode 240. For example, separation regions 251 may be formed along side lines or profiles of the first radiator 210, the second radiators 230 and the transmission line 220 to separate the dummy pattern 250 from the first radiator 210, the second radiators 230 and the transmission line 220.

As described above, by arranging a dummy pattern 250 having the mesh structure substantially same as at least one of the first radiator 210, the second radiators 230 and the transmission line 220 around the first radiator 210, the second radiators 230 and the transmission line 220, it is possible to prevent the antenna pattern from being viewed by a user of the display device on which the antenna device is mounted due to a difference in the electrode arrangement for each position.

Figure 7:
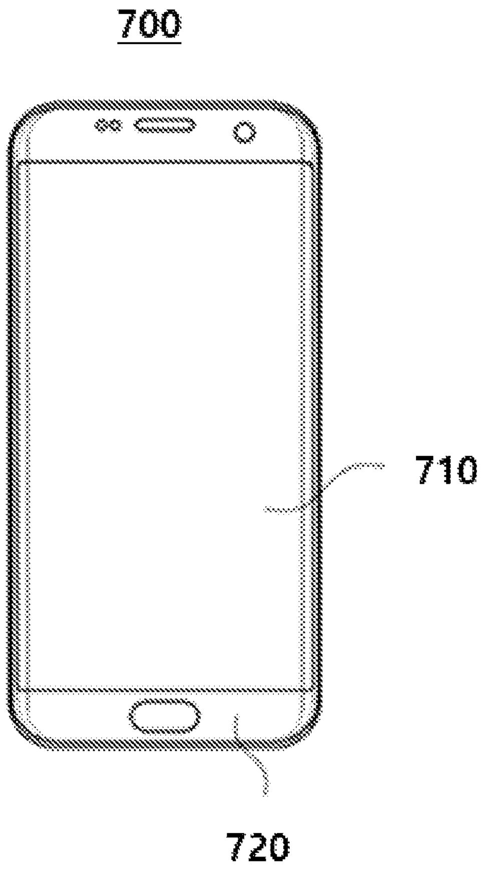
FIG. 7 is a schematic plan view for describing a display device according to an exemplary embodiment.

FIG. 7 is a schematic plan view illustrating a display device according to an embodiment. More specifically, FIG. 7 is a view illustrating an external shape including a window of the display device.

Referring to FIG. 7, a display device 700 may include a display region 710 and a peripheral region 720. The peripheral regions 720 may be disposed on both sides and/or both ends of the display region 710, for example.

According to an embodiment, the above-described antenna device may be inserted into the display device 700 in the form of a film or patch. For example, the first radiators 210 and 310, the second radiators 230 and 430, and the transmission line 220 of the antenna device may be arranged to at least partially correspond to the display region 710 of the display device 700, and the pad electrode 240 may be arranged to correspond to the peripheral region 720 of the display device 700.

The peripheral region 720 may correspond to a light-shielding part or a bezel part of the display device 700, for example. In addition, a driving circuit such as an IC chip of the display device 700 and/or the antenna device may be disposed in the peripheral region 720.

By disposing the pad electrode 240 of the antenna device so as to be adjacent to the driving circuit, signal loss may be suppressed by shortening a path for transmitting and receiving signals.

When the antenna device includes the dummy pattern 250, the dummy pattern 250 may be disposed so as to at least partially correspond to the display region 710 of the display device 700.

The antenna device includes the antenna unit and/or the dummy pattern, which are formed in a mesh structure, such that it is possible to significantly reduce or suppress the pattern from being viewed while improving the transmittance. Accordingly, image quality in the display region 710 may also be improved while maintaining or improving desired communication reliability.

The present invention has been described with reference to the preferred embodiments above, and it will be understood by those skilled in the art that various modifications may be made within the scope without departing from essential characteristics of the present invention. Accordingly, it should be interpreted that the scope of the present invention is not limited to the above-described embodiments, and other various embodiments within the scope equivalent to those described in the claims are included within the present invention.

Experimental Example: Evaluation of Performances of First Radiator and Second Radiator According to a Separation Distance, i.e., Interval D Therebetween A first radiator and second radiators having the shape as shown in FIG. 2 were formed on the dielectric layer. Antenna gains of the first radiator and the second radiators were measured while increasing the separation distance D between the second radiators and the first radiator.

TABLE 1

| | D (μm) | Gain of first radiator (dBi)@ 28 GHz | Gain of second radiator (dBi)@ 38 GHz |
|---|---|---|---|
| Example 1 | 10 | 7.0 | 6.1 |
| Example 2 | 25 | 7.3 | 6.2 |
| Example 3 | 50 | 8 | 6.4 |
| Example 4 | 75 | 8.1 | 7.3 |
| Example 5 | 100 | 7.9 | 7.0 |
| Example 6 | 125 | 7.8 | 6.5 |
| Example 7 | 250 | 7.3 | 6.4 |

TABLE 1-continued

| | D (μm) | Gain of first radiator (dBi)@ 28 GHz | Gain of second radiator (dBi)@ 38 GHz |
|---|---|---|---|
| Example 8 | 375 | 6.9 | 6.4 |
| Example 9 | 500 | 6.4 | 6.3 |
| Example 10 | 625 | 6.3 | 6.2 |

Referring to Table 1, it can be seen that as the separation distance D between the second radiator and the first radiator is increased, the antenna gain of the first radiator and the antenna gain of the second radiator are increased and then decreased. In particular, it can be seen that when the separation distance D is 50 μm to 125 μm, the first radiator and the second radiator may obtain an excellent level of antenna gain, respectively.

What is claimed is:

1. An antenna device comprising:

a dielectric layer;

a rhombus-shaped first radiator disposed on an upper surface of the dielectric layer;

a transmission line connected to the first radiator;

a signal pad connected to one end of the transmission line;

a ground pad disposed around the signal pad; and a second radiator extending from the ground pad along a lower side of the first radiator, wherein the second radiator has a corner cut portion, and the corner cut portion and the lower side of the first radiator extends in parallel at a regular interval in a range from 50 μm to 125 μm.

2. The antenna device according to claim 1, wherein the first radiator has a shape in which one or more corners are cut.

3. The antenna device according to claim 1, wherein a resonance frequency of the first radiator and a resonance frequency of the second radiator are different from each other.

4. The antenna device according to claim 1, wherein the second radiator is electrically and physically separated from the first radiator and the transmission line.

5. The antenna device according to claim 1, wherein the second radiator and the ground pad are formed as a single member.

6. The antenna device according to claim 1, wherein at least one of the first radiator, the second radiator and the transmission line is formed in a mesh structure, and at least one of the signal pad and the ground pad is formed in a solid structure.

7. The antenna device according to claim 1, wherein the second radiator includes a pair of second radiators disposed to face each other with the transmission line interposed therebetween on the upper surface of the dielectric layer.

8. The antenna device according to claim 1, further comprising a dummy pattern disposed around the first radiator and the second radiator on the upper surface of the dielectric layer.

9. The antenna device according to claim 8, wherein the dummy pattern is formed in a mesh structure.

10. A display device comprising the antenna device according to claim 1.

* * * * *